Sept. 26, 1944.  J. R. ALBERS  2,358,781
WIND DRIVEN POWER SYSTEM
Filed Dec. 22, 1941  2 Sheets-Sheet 2

INVENTOR
John R. Albers
BY Sam J. Slotsky
ATTORNEY

Patented Sept. 26, 1944

2,358,781

UNITED STATES PATENT OFFICE 2,358,781

WIND-DRIVEN POWER SYSTEM

John R. Albers, Sioux City, Iowa, assignor to Wincharger Corporation, Sioux City, Iowa, a corporation of Minnesota Application December 22, 1941, Serial No. 424,029

17 Claims. (Cl. 290—44)

My invention pertains to a wind driven power system.

An object of my invention is to provide a wind driven electric power system wherein the efficiency of the impeller blades used in the system is the greatest for all wind speeds in a given range, and wherein a variable transmission control is provided to match the impellers to the wind characteristics to secure the best results, and to provide an alternating current generator attached to the rotating impeller structure wherein the performance of the generator is also matched with the blades, with the generator rotating at a constant fixed speed, a characteristic of the impeller blades being changed at wind speeds above a predetermined speed for the purpose of maintaining constant speed.

A further object of my invention is to provide a transmission control, either electrical or mechanical, wherein the power and speed ranges between the propeller and the alternator are changed in response only to the wind velocity.

Figure 1:
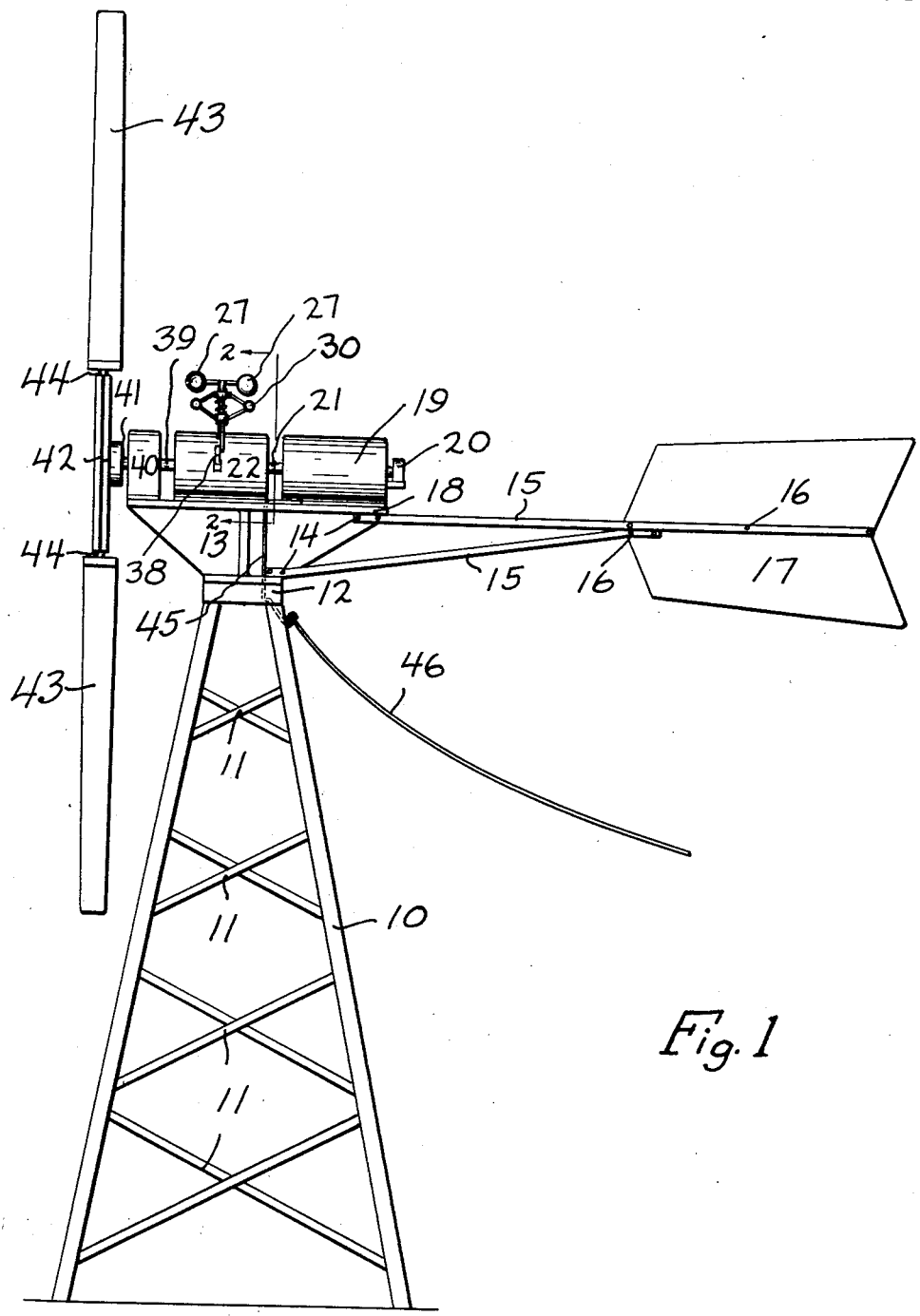
Figure 2:
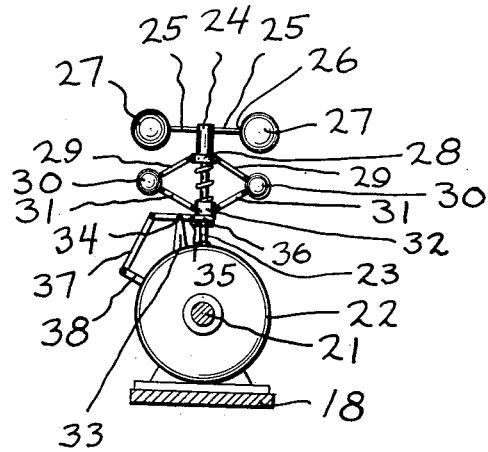
Figure 3:
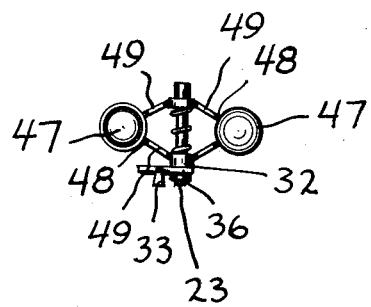

The features of my invention which I believe to be novel are set forth with particularity in the appended claims. My invention itself, both as to its organization and manner of operation, together with further objects and advantages thereof may best be understood by reference to the following description taken in connection with the accompanying drawings in which:

Figure 1 is a side elevation of a tower mounted unit incorporating my invention, Figure 2 is an enlarged detail taken partially in section along the lines 2—2 of Figure 1, and Figure 3 is a modified type of governor for use in the embodiment of Figure 1.

It has been common practice in the wind electric power art to drive a constant speed alternating current generator similar to a direct current generator by having a constant speed ratio between the impeller and the electric generating unit. Such a method has been proven to be erroneous inasmuch as it has been recognized in the wind power art that each different wind wheel, wind turbine, or wind impeller structure, has certain operating characteristics, and operates at best efficiency substantially at only one tip speed ratio. As an example, assuming the best tip speed ratio is 8 to 1, the propeller tip should travel at a speed in its circle of travel at eight times the speed of the oncoming wind against the impeller, and the impeller blades then operate at a maximum efficiency and develop their greatest power. It is therefore clearly obvious that the wind impelled structure should travel at a different rate of speed for each different wind velocity in order to secure the maximum efficiency thereof at each different velocity.

In my invention, an alternating current generator speed is fixed, and means are provided to allow the driving impeller to travel over a range of speeds corresponding to existing wind speeds that are to be utilized, and maintain the maximum efficiencies of the blades at such speeds.

Another important feature involved in this arrangement is that a fixed alternating current generator speed is necessary for phase or frequency control, especially when the generator is used as an auxiliary unit to a power line or for other standard purposes wherein fixed generator speeds are essential.

To provide the above mentioned results, I shall now describe the features of my invention. I have used the character 10 to designate a steel tower suitably braced at 11 which includes the cap 12 upon which rests a turntable 13 adapted to revolve on the cap and attached to the turntable 13 at 14 are the rearwardly extending supports 15 which are attached at 16 to the tail vane 17 used to maintain the unit into the wind. Mounted on the turntable 13 is the platform 18 upon which rests an alternating current generator 19 having a suitable speed responsive field control governor 20 and attached to the shaft 21 of the alternator 19 is a casing 22 which includes a mechanical or electrical variable transmission. Attached to and above the casing 22 is a vertical spindle 23 at the top of which freely rotates a bearing 24 to which are attached the arms 25 to which arms at 26 are attached the semi-spherical hollow cups 27. Forming an integral part of the bearing 24 is an expanded collar 28 (see Figure 2) to which is pivotally attached the links 29 which are attached in turn to the fly ball governor members 30 which are also pivotally attached to further links 31 which links are pivotally attached to the collar 32 which collar 32 is adapted to slide upon the spindle 23. Attached to the member 22 is the upstanding bracket 33 to which is pivoted at 34 the lever 35 including the fork extension 36 which is slidably and loosely engaged with the collar 32. Pivotally attached at the end of the lever 35 is a link 37 which is attached to the transmission control lever 38. Communicating with the transmission within the casing 22 is a further shaft 39 which is attached to suitable gearing in the casing 40, such gearing being at a fixed ratio to normally provide a greater speed to the shaft 39 than the impeller structure speed. Passing from the casing 40 is a further shaft 41 which is attached to a housing 42 which housing includes any suitable type of governing arrangement, centrifugal or otherwise, for turning the impeller blades to change the pitch thereof at a speed above predetermined wind speed. The impeller blades comprising a wind driven impeller structure are designated by the character 43 and are attached to the radial shafts 44 which shafts pass within the housing 42 to the above mentioned governor control. It is thus evident that the wind driven impeller structure 43 drives the generator 19 through the variable transmission in casing 22 which allows the impeller to rotate at variable speeds and correspondingly the generator to rotate at substantially constant speed.

The radially positioned impeller blades 43 up to a certain wind velocity within the range of the transmission arrangement present a minimum angle of pitch to the wind, with the governor adapted to change the pitch only above such velocities. The leads from the generator are indicated generally by the characters 45 and 46 wherein they will pass to a transmission line or electric conductor mains systems in which a fixed frequency alternating potential is maintained.

The wind driven hemispherical cups 27 incorporated in a wind driven motor for varying the characteristics of the variable transmission in casing 22 and responsive to wind speed are adapted to rotate at a speed which is proportional to the wind forces there-against and by such rotation correspondingly actuate the fly balls or centrifugal device 30 so that through the mechanical connections described the collar 32 pivots the lever 35 thereby swinging the variable transmission control lever 38 to provide different speed and power ratios between the shaft 39 and the shaft 21. As explained heretofore the casing 22 includes either an electric or mechanical variable speed transmission, the lever 38 correspondingly affecting the resistance of the fields in the electrical type, or affecting gear or other ratios in the mechanical type.

The above described unit includes four interconnected parts; the alternator 19, variable speed transmission 22, gear case 40, and impellers 43 having speed governing means. These are controlled by three separate fly-ball governors.

The function of the first governor 30 on the variable speed transmission is to regulate the transmission ratio at all times. Its purpose is to maintain proper speed ratio between the impeller and the generator in different wind speeds. This governor is wind driven and responds to variations in wind. Its inertia is such that it is a little "ahead" of the impeller at all times both during increase and decrease of speed in order to have the right gear ratio ready at all times for the impeller.

The generator speed responsive governor 20 which is driven by the generator shaft has for its function the regulation of the field strength in the generator so as to produce a condition of synchronism between the generator and existing power line. The further governor in the housing 42 has for its purpose the regulation of the speed of the impeller in the presence of wind speeds above twenty miles per hour so that the generator continues delivering full output. This impeller governor then has to be relied upon to maintain accurate generator speed regulation since at this point the transmission governor has brought the ratio changing lever to a maximum position and the generator field governor also has reached its maximum position since speed is constant.

I will now follow the operation of this machine through a complete cycle of winds. The wind will be assumed to be seven miles per hour to start with and each of these governors is at its minimum position. That is, transmission governor has the speed ratio set at its maximum in order to get the maximum amount of generator revolutions for the low impeller speed. The generator governor rests at a position where the field strength is at minimum and the propeller governor is naturally at a minimum also so that impeller pitch is minimum. With a seven mile wind the impeller is running at a speed such that the generator is at synchronous speed ready to be connected to the power line. By synchronizing I mean the action that takes place when the generator 19 falls into step after it has been running near synchronous speed and connection is made between the generator 19 and the transmission line (not shown), the field control governor 20, responsive to that speed, having adjusted the field of generator 19 to a suitable intensity. At this point when the generator 19 is connected to the power line, it can be assumed that practically no current is flowing into the power line, because the field of generator 19 was properly adjusted so that the output voltage was equal to line voltage. Upon increase in wind speed to ten miles per hour, a slight over-run occurs in the generator before connection is made between generator and transmission line. The generator governor immediately responds to the speed increase and begins strengthening the field. This continues until the field is slightly overexcited causing a slight drop in generator speed, or at least a drop back to normal speed as the generator pulls into step. The transmission governor 30 has also made a change during this interval. The wind has increased from seven to ten miles per hour which has forced the wind driven governor 30 to take a new position slightly before the impeller had the opportunity to pick up its extra R. P. M. With this governor going to a new position it has correspondingly caused a reduction in the gear ratio of the transmission enabling the impeller to take on the necessary extra R. P. M. to conform to the added wind speed and to maintain the desired tip speed ratio for maximum efficiency.

This process continues up to twenty miles per hour at which time the wind has sufficient power to drive the generator at full output. By this time with these successions of increased energy available at the impeller the generator governor has moved to a maximum position at which the generator field is sufficiently excited at full load to deliver the necessary current at good power factor. The wind driven transmission governor operating in the twenty mile wind now has the speed ratio changed to its range limit giving the lowest possible ratio. That is, generator 19 is still running at synchronous speed and the impeller is operating at substantially double the speed that it was at ten miles per hour and still has substantially the same tip speed ratio as it had at seven and ten miles per hour. By making these gradual changes the tip speed ratio of the propeller is maintained substantially at one fixed value. At the same time the generator speed and power factor have been maintained by loading and unloading the field as necessary by the governor 20 on the generator.

In winds above twenty miles per hour the only governor operable to control the arrangement is the impeller pitch governor in the housing 42. This maintains the twenty mile per hour speed by varying the pitch of the blade to a steeper angle as the wind increases above twenty miles per hour. Finally, assuming a 100 mile per hour wind, the blade is forced to a position of, for example, as much as 60° pitch and if necessary can be moved to a still steeper angle.

When wind velocity is reducing from a high speed around 20 miles per hour practically the same sequence of operations takes place in reverse. The impeller governor is the only active control down to the twenty mile wind speed. Below that wind speed the pitch change governor is inactive. Then both the transmission and the generator governors again come into action. The governor on the generator does practically all of the accurate or minute speed governing from seven to twenty miles an hour by controlling phase angle, that is, power factor of the generator and, in consequence, the generator loading. It responds to slight excesses of power and slight deficiencies of power imparted from the impeller. Any tendency to over-run the generator immediately brings in extra field strength and any tendency for the generator to under-run immediately diminishes the field strength. This keeps the generator at synchronous speed and good power factor at all wind speeds between twenty miles an hour and seven miles an hour.

A further modified form of my governing device is shown illustrated in Figure 3 wherein the fly ball members 30 are not used, and the hollow cups 47 are pivotally attached at 48 to the links 49 to operate the collar 32 in the same manner as hereinabove described. In this type of structure the cups 47 are similar to the hollow cups 27 with the exception that they are made larger and substantially heavier, so that they constitute a type of wind rotor as well as governing members in that their exposed faces turn when impinged upon by the wind, and at the same time the masses are centrifugally urged outwardly.

While I have shown and described the particular embodiments of my invention, it will be obvious to those skilled in the art that changes and modifications may be made without departing from my invention in its broader aspects, and I, therefore, aim in the appended claims to cover all changes and modifications as fall within the true spirit and scope of my invention.

I claim as my invention:

1. In combination with a rotating wind driven impeller structure and a substantially constant speed power device driven thereby, a variable speed transmission connected between the wind driven impeller structure and the power device, means responsive only to wind speed and substantially independent of the power developed by said impeller structure for adjusting said transmission, and means including said last mentioned means for providing constant speed drive for said power device as said impeller structure is driven at varying impeller speeds according to wind velocities in which said impeller structure operates.

2. In combination with a rotating wind driven impeller structure and a fixed speed alternating current electric generator driven thereby, a variable speed transmission connected between the wind driven impeller structure and the generator, means responsive to wind speed and substantially independent of the power developed by said impeller structure for adjusting said transmission, and means including said last mentioned means for providing constant speed drive for said generator as said impeller structure is driven at varying impeller speeds according to wind velocities in which said impeller structure operates.

3. In combination with a rotating wind driven impeller structure and a fixed speed electric generator, a variable speed transmission connected between the wind driven impeller structure and the generator, a wind driven motor, means substantially independent of the power developed by said impeller structure connecting said wind driven motor and said transmission for varying said transmission according to varying wind speeds, and means including said last mentioned means for producing constant speed drive for said generator from said impeller structure as said structure is driven at varying speeds according to the speed of wind driving said impeller structure.

4. In combination with a rotating wind driven impeller structure and a fixed speed electric generator driven thereby, a variable transmission connected between the wind driven impeller structure and the generator to permit varying impeller speeds according to wind velocities in which said impeller structure operates, a wind driven motor adjacent to said variable transmission means connecting said wind driven motor and said transmission for varying the latter according to varying wind speeds, said wind driven motor including a plurality of substantially semi-spherical cups, radially positioned arms attached to the cups, a central axis upon which said arms are journalled, a fly ball governor slidably attached on said axis, a link attached to said governor and the control lever of said transmission whereby centrifugal urging of said governor will vary the transmission.

5. In combination with a rotating wind driven impeller structure including radially positioned impeller blades and governing means for changing the pitch of said impeller blades at speeds thereof above a predetermined speed, a variable speed transmission connected to said impeller structure, a substantially constant speed power device attached to said variable transmission, and means responsive to wind speed for adjusting said variable speed transmission to produce constant speed drive of said power device as said impeller is driven at varying impeller speeds below said predetermined speed according to wind velocities in which said impeller structure operates.

6. In combination with a rotating wind driven impeller structure including radially positioned impeller blades and governing means for changing the pitch of said impeller blades at a predetermined wind speed, a variable transmission connected to said impeller structure, a substantially constant speed power device attached to said variable transmission, said variable transmission being adapted to permit varying impeller speeds according to wind velocities in which said impeller structure operates, means for varying said transmission up to the predetermined wind speed only, said governing means causing the pitch of said impeller blades to change above said predetermined wind speed.

7. In combination with a rotating wind-driven impeller structure and a fixed speed alternating current electric generator connected for supplying alternating current to an electric conductor mains system in which a fixed frequency alternating potential is maintained, a variable speed transmission connected between said impeller structure and said generator, means responsive to wind speed for adjusting said transmission to provide substantially constant speed drive for said generator as said impeller structure is driven at varying impeller speeds above a predetermined minimum speed, and means responsive to an increase in speed of said generator past said predetermined minimum speed for synchronizing operation of said generator with said alternating potential.

8. In combination with a rotating wind-driven impeller structure and a substantially constant speed power device, a variable speed transmission connected between said impeller structure and said power device, and means responsive only to wind speed for adjusting said transmission to provide constant speed drive for said power device as said impeller structure is driven at varying impeller speeds according to wind velocities in which said impeller structure operates, said means comprising a plurality of substantially hemispherical cups arranged to rotate about an axis in the path of wind driving said impeller structure and to cause adjustment of said transmission as the speed of rotation of said cups varies.

9. In combination with a rotating wind-driven impeller structure including radially positioned impeller blades and governing means for changing the pitch of said blades at impeller speeds above a predetermined speed, a variable speed transmission driven by said impeller structure, a substantially constant speed power device driven by said variable speed transmission, and means responsive to wind speed for adjusting said transmission to provide substantially constant speed drive for said power device up to said predetermined speed of said impeller at varying wind velocities.

10. In combination with a rotating wind-driven impeller structure including radially positioned impeller blades and governing means for changing the pitch of said blades at impeller speeds above a predetermined speed, a variable speed transmission driven by said impeller structure, a substantially constant speed power device driven by said variable speed transmission, and means responsive to wind speed for adjusting said transmission to provide substantially constant speed drive for said impeller structure up to said predetermined speed of said impeller at varying wind velocities, said adjusting means comprising a plurality of substantially hemispherical cups arranged to rotate about an axis in the path of wind driving said impeller structure and arranged to cause adjustment of said variable speed transmission in response to rotation of said cups.

11. In combination with a rotating wind driven impeller structure and a substantially constant speed power device, a variable speed transmission connected between said impeller structure and said power device, means comprising a centrifugal device rotatable in response to wind speed and substantially independent of the power developed by said impeller structure to produce a motion for adjusting said transmission in response to said motion, and means including said last mentioned means for providing substantially constant speed drive for said power device from said impeller structure as said structure is driven at varying impeller speeds according to wind velocities in which said impeller structure operates.

12. In combination with a rotating wind driven impeller structure and a substantially constant speed power device, a variable speed transmission connected between said impeller structure and said power device, means comprising a centrifugal device rotatable in response to wind speed and substantially independent of the power developed by said impeller structure to produce a motion for adjusting said transmission in response to said motion, and means including said last mentioned means for providing substantially constant speed drive for said power device as said impeller structure is driven at varying impeller speed according to wind velocities in which said impeller structure operates, said centrifugal adjusting means having less moment of inertia than said impeller structure whereby said variable speed transmission is adjusted, as said wind velocity changes, a substantial time before the speed of rotation of said impeller structure changes correspondingly.

13. In a constant frequency alternating current power system, an alternating current generator arranged for connection with said alternating current system, a variable speed rotating wind driven impeller subject to variable speeds of rotation in variable winds, means including a connection between the impeller and generator for converting variable speeds of impeller rotation in variable wind speeds to substantially constant speed of generator rotation, means responsive to an increase in speed of said impeller past a predetermined speed for synchronizing said alternating current generator with said system, and means for maintaining the speed of said generator constant as said impeller tends to rotate at speeds above said predetermined speed.

14. In a constant frequency alternating current power system, an alternating current generator arranged for connection with said alternating current system, a variable speed rotating wind driven impeller subject to variable speeds of rotation in variable winds, a variable translating device connected between the impeller and generator for converting variable speeds of impeller rotation in variable wind speeds to substantially constant speed of generator rotation, means responsive to an increase in speed of said impeller past a predetermined speed for synchronizing said alternating current generator with said system, means for maintaining the speed of said generator constant after said impeller exceeds said predetermined speed, and means for varying the pitch of said impeller after it exceeds said predetermined speed.

15. In a constant frequency alternating current power system, an alternating current generator arranged for connection with said alternating current system, a variable speed rotating wind driven impeller structure subject to variable speeds of rotation in variable winds, a variable translating device connected between the impeller structure and generator for converting variable speeds of impeller structure rotation in variable wind speeds to substantially constant speeds of generator rotation, and means responsive to an increase in speed of said impeller structure above a predetermined speed for synchronizing said generator with said alternating current system.

16. In a constant frequency alternating current power system, an alternating current generator arranged for connection with said alternating current system, a rotating wind driven impeller structure driven by winds of variable speeds, means for connecting the impeller structure to the generator, means including a connection between the impeller structure and generator for converting variable speeds of impeller rotation in variable wind speeds to substantially constant speed of generator rotation, and means responsive to an increase in speed of said impeller structure above a predetermined speed for synchronizing said generator with said alternating current system.

17. In combination, a variable speed rotating wind driven impeller structure subject to variable speeds of rotation in variable winds, a substantially constant speed power absorbing device, a variable translating device connected between the impeller structure and power absorbing device and responsive to wind speed only and independent of the power developed by said impeller structure, and means including said variable translating device for converting variable speeds of impeller rotation in variable wind speeds to substantially constant speeds of power absorbing device rotation.

JOHN R. ALBERS.